BEST AVAILABLE COPY
DESIGN.
D. S. McDANNELL, Jr.
SIGN POST.
Reissued Aug. 19, 1919. 14.711.
APPLICATION FILED MAY 14, 1919.
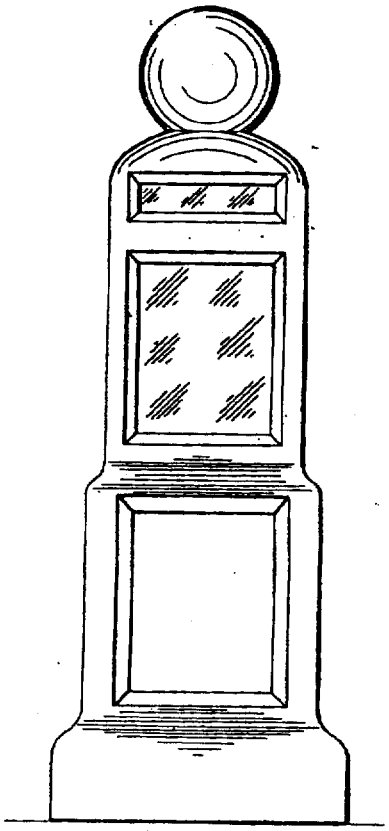
Witness:
Erick G. Erickson.
Inventor:
Decatur S. McDannell, Jr.
By Wayne G. Duffield
Attorney.
THE COLUMBIA PLANOGRAPH CO., WASHINGTON, D. C.

BEST AVAILABLE COPY

UNITED STATES PATENT OFFICE.

DECATUR S. McDANNELL, JR., OF MOLINE, ILLINOIS.

DESIGN FOR A SIGN-POST.

14,711. Specification for Reissued Design. Reissued Aug. 19, 1919.

Original No. 52,750, dated December 10, 1918, Serial No. 253,832, filed September 12, 1918, for 7 years. Application for reissue filed May 14, 1919. Serial No. 297,177. Term of patent 7 years.

*To all whom it may concern:*

Be it known that I, DECATUR S. McDANNELL, Jr., a citizen of the United States, residing at Moline, in the county of Rock Island and State of Illinois, have invented a new, original, and ornamental Design for a Sign-Post, of which the following is a specification, reference being had to the accompanying drawing, forming part thereof.

The figure is an elevation of a sign post, showing my design.

I claim:

The design for a sign post as shown.

DECATUR S. McDANNELL, JR.

Copies of this patent may be obtained for five cents each, by addressing the "Commissioner of Patents, Washington, D. C."